(12) United States Patent
Szurley et al.

(10) Patent No.: US 11,313,754 B2
(45) Date of Patent: Apr. 26, 2022

(54) LEAK DETECTION FOR PIPING SYSTEMS USING A SOUND SIGNAL

(71) Applicant: Robert Bosch GmbH, Stuttgart (DE)

(72) Inventors: Joseph Szurley, Upper Saint Clair, PA (US); Billy Li, Pittsburgh, PA (US); Samarjit Das, Sewickley, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/957,901

(22) PCT Filed: Dec. 14, 2018

(86) PCT No.: PCT/EP2018/085000
§ 371 (c)(1),
(2) Date: Jun. 25, 2020

(87) PCT Pub. No.: WO2019/129510
PCT Pub. Date: Jul. 4, 2019

(65) Prior Publication Data
US 2020/0326257 A1   Oct. 15, 2020

Related U.S. Application Data

(60) Provisional application No. 62/610,418, filed on Dec. 26, 2017.

(51) Int. Cl.
*G01M 3/24* (2006.01)
*G06N 20/00* (2019.01)
*E03B 7/07* (2006.01)

(52) U.S. Cl.
CPC .............. *G01M 3/243* (2013.01); *E03B 7/07* (2013.01); *G06N 20/00* (2019.01)

(58) Field of Classification Search
CPC ........... G01M 3/243; G06N 20/00; E03B 7/07
(Continued)

(56) References Cited

U.S. PATENT DOCUMENTS

| 3,442,349 A | 5/1969 | Bosselaar |
| 6,453,247 B1 | 9/2002 | Hunaidi |

(Continued)

FOREIGN PATENT DOCUMENTS

| WO | 2013/025526 A1 | 2/2013 |
| WO | 2017/175136 A1 | 10/2017 |

OTHER PUBLICATIONS

International Search Report corresponding to PCT Application No. PCT/EP2018/085000, dated May 28, 2019 (6 pages).

*Primary Examiner* — Paul D Lee
(74) *Attorney, Agent, or Firm* — Maginot, Moore & Beck LLP (57) ABSTRACT

A system (100) for monitoring a pipe system (10) includes a first sensor device (102). The first sensor device (102) includes at least one sensor, a wake-up circuit (170), and a processor (172). The at least one sensor is configured to sense an operating characteristic of a piping section (12) of the pipe system (10), and includes a transducer configured such that an audio signal emanating in the piping section induces the transducer to produce a voltage signal indicative of the audio signal. The wake-up circuit (170) is operatively connected with the transducer, and generates a wake-up signal in response to the voltage signal being above a predetermined threshold. The processor (172) is operatively connected to the wake-up circuit (170) and to the at least one sensor, and is configured to identify an operating condition of the pipe system (10) with reference to the operating characteristic sensed by the at least one sensor in response to receiving the wake-up signal.

15 Claims, 8 Drawing Sheets

(58) Field of Classification Search
USPC .......................................................... 702/51
See application file for complete search history.

(56) References Cited

U.S. PATENT DOCUMENTS

| | | | |
|---|---|---|---|
| 9,664,589 B2* | 5/2017 | Horne | F17D 5/06 |
| 11,105,705 B1* | 8/2021 | Lowitz | G05D 7/0635 |
| 2006/0174707 A1* | 8/2006 | Zhang | G01N 29/4418 |
| | | | 73/592 |
| 2012/0285221 A1 | 11/2012 | Al-Qahtani et al. | |
| 2013/0041601 A1* | 2/2013 | Dintakurti | E03B 7/071 |
| | | | 702/51 |
| 2013/0145826 A1* | 6/2013 | Richarz | G01M 3/243 |
| | | | 73/49.1 |
| 2016/0161310 A1* | 6/2016 | Leaders | G01F 1/663 |
| | | | 702/48 |
| 2016/0252422 A1 | 9/2016 | Howitt | |

* cited by examiner

LEAK DETECTION FOR PIPING SYSTEMS USING A SOUND SIGNAL

CROSS-REFERENCE TO RELATED APPLICATIONS

This application is a 35 U.S.C. § 371 National Stage Application of PCT/EP2018/085000, filed on Dec. 14, 2018, which claims the benefit of priority to U.S. Provisional Application No. 62/610,418 filed on Dec. 26, 2017, the disclosures of which are incorporated herein by reference in their entirety.

TECHNICAL FIELD

This disclosure relates generally to fault detection in piping systems, and more particularly, to audio leak detection.

BACKGROUND

Piping systems are customarily installed underground, inside walls or ceilings, or in other locations where pipes are not completely visible. As a result, when a leak occurs, the leak may go undetected for some time, and the actual location of the leak may be difficult to determine. Leaks in a piping system not only release fluid out into the environment, but also make it possible for contaminants to enter the piping system. Promptly detecting and locating a leak can help minimize these risks.

Leak detection techniques that use pressure sensors have been developed. Fluids generally travel under pressure within a piping system. A leak can cause the pressure in the system to drop, which can be detected using a pressure sensor. In some instances, the pressure drop in the system due to a leak may not be discernable from normal pressure head losses in a system, with the result that there may be a delay before the leak is detected.

Audio leak detection techniques have also been developed. In one example, a pressure drop in a pipe due to a leak induces a pressure fluctuation that sends an acoustic signal upstream and downstream from the leak that is detectable via a vibration sensor. Correlating vibration detections at multiple locations in a system enables the determination of a location of the leak in the system. In another example, ultrasound signals are transmitted through targeted portions of a pipe, whereby the effect of the fluid in the pipe on the signal is used to detect a leak. These conventional systems exhibit a variety of disadvantages, as discussed below.

Vibrations at various frequencies are produced from a variety of sources, with the result that false-positive leak detections in such systems are common. In one conventional system, leak detection is only conducted in "quiet hours" where outside noise such as from traffic or construction is minimized, with the disadvantage that a leak may be present for a long period of time before the quiet hours begin and detection commences.

Conventional systems are also generally either of the always-on variety, or only check for leaks at preset intervals. Always-on systems require a significant amount of power that can drain a sensor battery or require an expensive and complex wired power connection. Interval systems may delay detection of a leak occurring in the period of time between scheduled leak detections.

Additionally, there are instances where a leak may not produce an audio signal detectable by a sensor, leading to false-negative determinations. The leak may be out of range of the sensor, the signal may be too weak to be detected, or the audio signal may be masked by surrounding noise from the environment.

Further, systems that utilize a plurality of sensors over a piping system generally require a centralized hub or server to process the sensor data and locate a leak. Not only does a central hub add to the complexity and expense of a system, but also a central hub acts as a single point of failure in a system. Also, the need for all of the sensors to communicate with a central hub increases the complexity and cost of communications through the system.

Therefore, a leak detection system that reduced false readings would be beneficial. A system that is usable in a wide variety of ambient noise conditions would also be beneficial. A system that does not require a central hub would also be beneficial. A system that is able to detect leaks in a wide variety of circumstances would also be beneficial.

SUMMARY

In order to monitor a pipe system without downtime between monitoring interval, a monitoring system is configured to wake-up in response to audio signals emanating from piping sections of the pipe system.

In an exemplary embodiment, a sensing device includes at least one sensor, a wake-up circuit, and a processor. The at least one sensor is configured to sense an operating characteristic of a piping section of the pipe system, and includes a transducer configured such that an audio signal emanating in the piping section induces the transducer to produce a voltage signal indicative of the audio signal. The wake-up circuit is operatively connected with the transducer, and generates a wake-up signal in response to the voltage signal being above a predetermined threshold. The processor is operatively connected to the wake-up circuit and to the at least one sensor, and is configured to identify an operating condition of the pipe system with reference to the operating characteristic sensed by the at least one sensor in response to receiving the wake-up signal.

In some embodiments, the sensing device further includes a fastening mechanism configured to mount the sensing device on the piping section. The transducer is positioned on the fastening mechanism such that the transducer is in direct contact with a surface of the piping section when the sensing device is mounted on the piping section via the fastening mechanism.

In some embodiments, the at least one sensor further includes a temperature sensor configured to sense a temperature of the piping section, and a humidity sensor configured to sense a humidity in an area around the piping section. The temperature sensor is positioned on the fastening mechanism such that the temperature sensor is in direct contact with the surface of the piping section when the sensing device is mounted on the piping section via the fastening mechanism In some embodiments, the sensing device further includes a memory that stores a first machine learning algorithm, and first data. The first machine learning algorithm is operable by the processor to determine a normal operating condition of the pipe system with reference to the at least one sensor over time. The first data is indicative of the normal operating condition of the pipe system. The processor is further configured to identify a fault in the pipe system by determining that the identified operating condition diverges from the normal operating condition.

In some embodiments, the sensing device further includes a memory that stores first audio data and second audio data.

The first audio data is indicative of the audio signal emanating in the piping section. The second audio data includes an acoustic signature corresponding to a particular event occurring in at least one of the piping section and an area surrounding the piping section. The particular event corresponds to an operating condition of the pipe system. The processor is configured to identify the operating condition of the pipe system by comparing the audio signal from the first audio data and the acoustic signature of the second audio data, and determining that the audio signal is indicative of the particular event.

In some embodiments, the at least one sensor further includes a microphone configured to capture a further audio signal emanating from an area surrounding the piping section. The processor is further configured to apply a noise-cancelling algorithm to the audio signal emanating in the piping section with reference to the further audio signal.

In some embodiments, the memory further stores a second machine learning algorithm operable by the processor to identify a correspondence between a respective operating condition of the pipe system and a respective particular event In some embodiments, the sensing device further includes a communication module operatively connected to the processor, and operable to at least one of transmit and receive information with regard to the operating condition of the pipe system to and from an external device, respectively.

An exemplary embodiment of a monitoring system for monitoring a pipe system includes a first sensing device includes at least one sensor, a wake-up circuit, and a processor. The at least one sensor is configured to sense an operating characteristic of a piping section of the pipe system, and includes a transducer configured such that an audio signal emanating in the piping section induces the transducer to produce a voltage signal indicative of the audio signal. The wake-up circuit is operatively connected with the transducer, and generates a wake-up signal in response to the voltage signal being above a predetermined threshold. The processor is operatively connected to the wake-up circuit and to the at least one sensor, and is configured to identify an operating condition of the pipe system with reference to the operating characteristic sensed by the at least one sensor in response to receiving the wake-up signal.

In some embodiments, the first sensor device further includes a first communication module operatively connected to the processor, and operable to at least one of transmit and receive information with regard to the operating condition of the pipe system to and from an external device, respectively.

In some embodiments, the monitoring system further includes an actuator. The actuator includes a valve element and a second communication module. The valve element is operable to selectively restrict and enable flow through a portion of the pipe system. The information transmitted by the first communication module includes an activation instruction, and the second communication module is configured to receive the activation instruction, and activate the valve element in response to the received activation instruction.

In some embodiments, the monitoring system further includes a remote computing device. The remote computing device includes a third communication module, an output device, and a further processor. The third communication module is configured to at least one of transmit and receive information to and from the first sensing device. The further processor is operatively connected to the third communication module and the output device, and is configured to output, via the output device, information with regard to the operating condition of the pipe system received by the third communication module.

In some embodiments, the further processor is configured to transmit further information with regard to the operating condition of the pipe system to the first sensing device. The first sensing device further includes a memory that stores first data corresponding to the operating condition of the pipe system. The processor is configured to update the first data based on the further information in response to receiving the further information from the remote computing device.

In some embodiments, the monitoring system further includes an actuator. The actuator includes a valve element and a second communication module. The valve element is operable to selectively restrict and enable flow through a portion of the pipe system. The further information transmitted by the remote computing device includes an activation instruction. The second communication module is configured to receive the activation instruction, and activate the valve element in response to the received activation instruction.

In some embodiments, the first sensing device further includes a memory that stores that stores first audio data and second audio data. The first audio data is indicative of the audio signal emanating in the piping section. The second audio data includes an acoustic signature corresponding to a particular event occurring in at least one of the piping section and an area surrounding the piping section. The particular event corresponds to an operating condition of the pipe system. The processor is configured to identify the operating condition of the pipe system by comparing the audio signal from the first audio data and the acoustic signature of the second audio data, and determining that the audio signal is indicative of the particular event.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
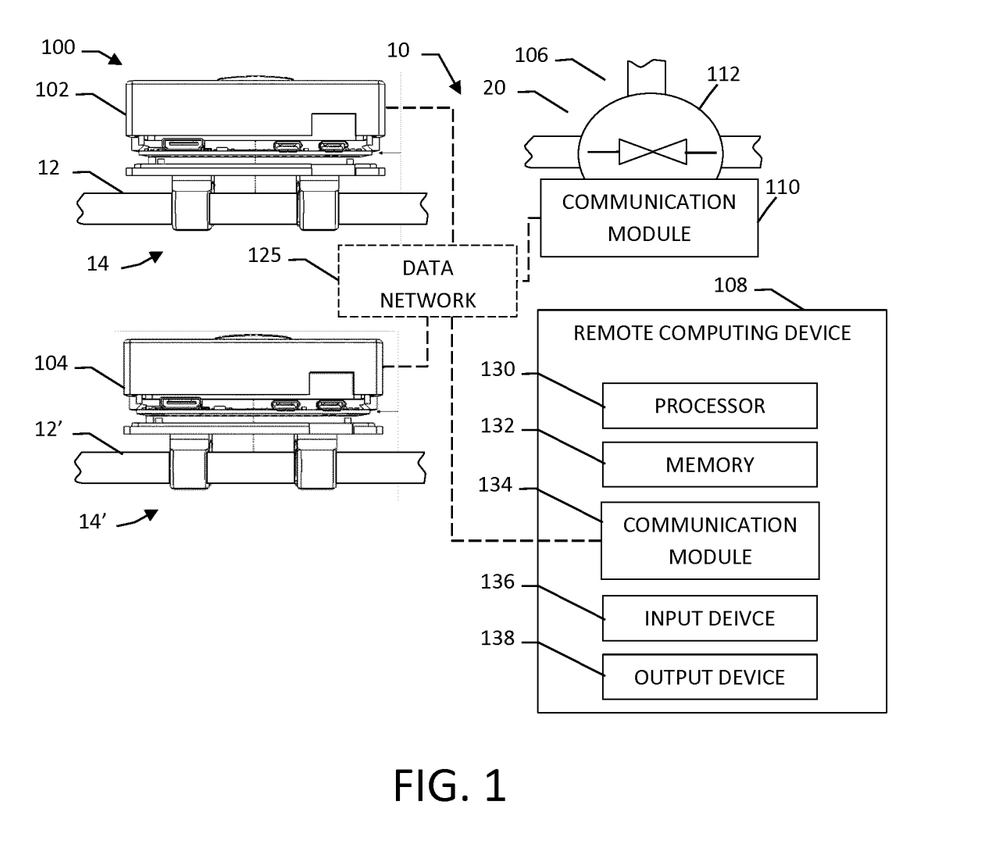
FIG. 1 depicts a schematic of a monitoring system for a piping system according to this disclosure.

FIG. 1 depicts a schematic of an exemplary embodiment of a system 100 for leak detection in a piping system 10. The system 100 includes a first sensor device 102, a second sensor device 104, an actuator 106, and a remote computing device 108. The elements of the system 100 are connected together via a data network 125.

The first sensor 102 is mounted on a section of pipe 12 of the piping system 10. As discussed in more detail below, the first sensor 102 is configured to detect operating conditions of the section of pipe 12 and an area 14 around the section of pipe 12, and the system 100 is configured to infer a status of the section of pipe 12 and/or the piping system 10 with reference to the operating conditions detected by the first sensor 102, and to selectively perform an operation with reference to the inferred status. As illustrative examples, in some embodiments, a detected operating condition includes a temperature, pressure, humidity, and/or acoustic measurement of the pipe section 12 and/or the area 14. In some embodiments, an inferred status of the piping system 10 includes a fault in the piping section 12 and/or pipe system 10. In some embodiments, an operation performed in response to an inferred status includes transmitting a notification of a fault to the remote computing device 108, activating the first sensor 102 and/or the second sensor 104, and/or actuating the actuator 106.

In this embodiment, the second sensor 104 includes similar components as the first sensor 102, and is configured in a similar manner. The second sensor 104 is mounted to another section of pipe 12', and, like the first sensor 102, is configured to detect operating conditions of the section of pipe 12' and an area 14' around the section of pipe 12'. The system 100 is further configured to infer a status of the piping system 10 with reference to the operating conditions detected by the second sensor 104, and to selectively perform an operation with reference to the inferred status. In some embodiments, the system 100 is further configured to infer a status of the piping system 10 with reference to the operating conditions detected by multiple sensors in combination. Referencing multiple sensors enables the system 100 to make inferences about the operating status of the piping system 10 that might otherwise be undiscernible or inaccurate. While the system 100 in this embodiment includes two sensors 102 and 104, the system 100 includes other numbers of sensors in other embodiments. Some embodiments only include one sensor, and some embodiments include more than two sensors.

The actuator 106 is positioned at a section of pipe 20 of the pipe system, and includes a communication module 110, and a valve element 112. The communication module 110 is configured to receive an activation instruction from other devices such as the first sensor 102, second sensor 104, and remote computing device 108, and activate the valve element 112 in response to the received activation instruction. In some embodiments, the communication module 110 is configured to act as a relay and transmit communications from one device to another, such as from the first sensor 102 to the second sensor 104 or to the remote computing device 108, or vice versa.

The valve element 112 is selectively operable to enable and restrict flow through the piping section 20. Any acceptable type of valve element is usable. In some embodiments, the actuator 106 is assigned to the first sensor 102, whereby the piping section 12 for the first sensor 102 is located proximate to the piping section 20 such that the actuator 106 is configured to enable and restrict flow through the piping section 12. In some embodiments, the system 100 includes a respective actuator assigned to each sensor. In some embodiments, the system 100 is configured to assign an actuator to a sensor dynamically with reference to information about the pipe system and a detected fault.

In various embodiments, the remote computing device 108 is any acceptable computing device, such as a personal computer, tablet, mobile phone, or the like. In some embodiments, the remote computing device 108 includes a server configured to communicate with one or more client devices. The remote computing device 108 includes a processor 130, a memory 132, a communication module 134, an input device 136, and an output device 138.

The processor 130 is operatively connected to the memory 132, the communication device 134, the input device 136, and the output device 138, and is configured to execute programming instructions stored in the memory 132. The memory 132 is configured to store data with reference to the pipe system 10 such as historical usage information, sensor data, audio data like acoustic profiles for ambient noise sources, and other data.

The communication device 134 is configured to send and receive transmissions from other components of the system 100, such as the first sensor 102, the second sensor 104, the actuator 106, and other devices remote from the system 100 via the data network 125. In various embodiments, the data network 125 enables the transfer of data and information via WiFi, BTE, LoRa, a light weight messaging protocol such as MQTT, or any other acceptable communications protocol. In some embodiments, the data network 125 includes a connection via the internet. In some embodiments, the communication device 134 provides access to the memory 132 to other devices and/or retrieves data from other devices and stores the retrieved data in the memory 132.

The input device 136 includes any acceptable device capable of receiving input from a user. Examples include a keyboard, a mouse, a touch-screen, and the like. The output device 138 includes any acceptable device capable of generating an output for the user. Examples include a visual display, an audio device, an indicator light, and the like.

While the system 100 in FIG. 1 includes a single remote computing device 108, other embodiments include any number of remote computing devices. In some embodiments, the system 100 does not include a remote computing device.

Figure 2:
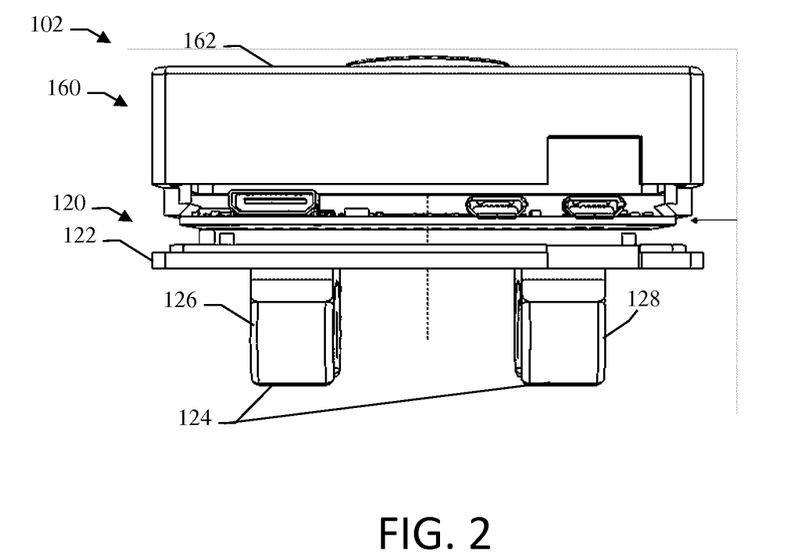
FIG. 2 depicts a side view of a sensing device for the monitoring system of FIG. 1.
Figure 3:
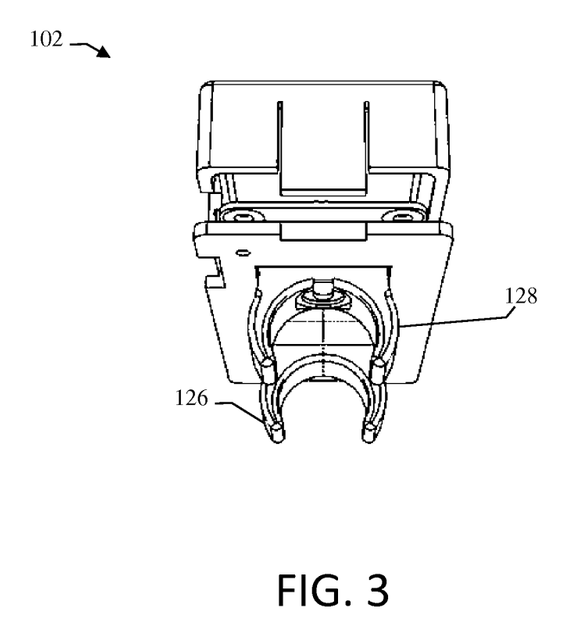
FIG. 3 front perspective view of the sensing device of FIG. 2.

FIGS. 2-5 depict a side view, perspective front view, bottom view, and top view respectively of the first sensor 102 from FIG. 1. As depicted in FIG. 2, the first sensor 102 includes a base portion 120 and an electronics portion 160. The base portion 120 includes a base plate 122 and a fixing mechanism 124. The base plate 120 supports the electronics portion 160. The fixing mechanism 124 is configured to fix the first sensor 102 onto the pipe section 12 (FIG. 1).

In this embodiment, the fixing mechanism 124 includes a first clip 126 and a second clip 128. Other numbers of clips and other fixing mechanisms are used in other embodiments. In this embodiment, the clips 126 and 128 are sized so as to correspond with a size of the piping section 12. In some embodiments, the clips and/or other fixing mechanism are configured to adjust so as to adapt to pipe sections of different sizes.

Figure 4:
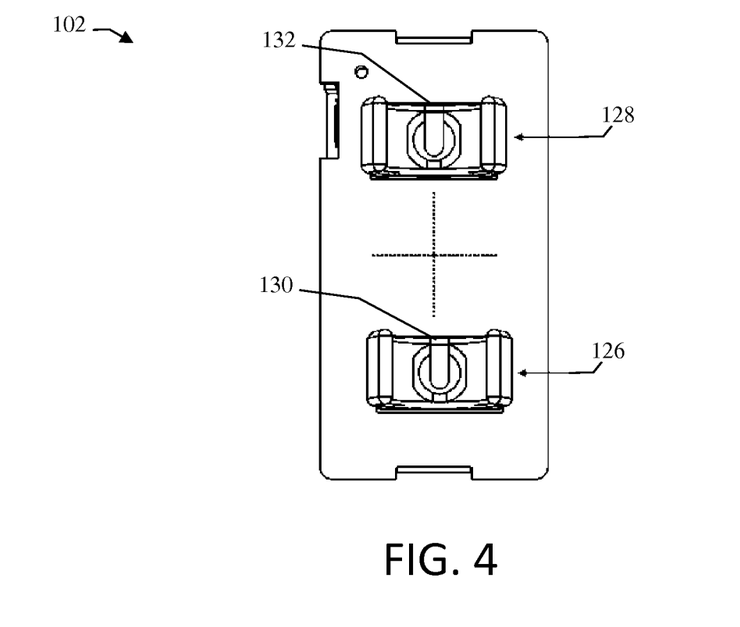
FIG. 4 depicts a bottom view of the sensing device of FIG. 2.

With reference to the bottom view of the first sensor 102 in FIG. 4, the first clip 126 includes an acoustic transducer 130. The transducer 130 is positioned so that, when the clip 126 is engaged with the piping section 12 to mount the first sensor 102 thereon, the transducer 130 is engaged with the piping section 12, and is configured to capture an audio signal from a surface 16 of the piping section 12. In some embodiments, the clip 126 is configured to exert a force, when mounted on the piping section 12, which acts to maintain a solid contact between the transducer 130 and the surface 16 of the piping section 12.

The transducer 130 is further configured to produce a voltage indicative of the signal, whereby a magnitude of the voltage corresponds with an audio level (dB) of the signal. In various embodiments, the transducer 130 is analog, digital, or a combination thereof. In some embodiments, the transducer 130 includes one or more of a vibration sensor, a piezo contact sensor, and an audio contact sensor. In this embodiment, the transducer 130 is configured so as to be powered via vibrations such that the voltage produced by the transducer 130 is induced due to the signal being received by the transducer 130. By operating off of induced power, the transducer 130 does not require a supply of power from the first sensor 102 in order to function.

In some embodiments, the first sensor 102 further includes an analog-to-digital converter (not shown) configured to convert an analog signal from the transducer 130 into a digital signal. In various embodiments, the converter is included with the transducer 130, the clip 126, the electronics portion 160, or is located at any other acceptable location on the first sensor 102. In various other embodiments, the transducer 130 is located at any other acceptable position on the sensor 102 so that the transducer 130 maintains a surface contact with the surface 16 of the piping section 12 when the first sensor 102 is mounted thereon.

The clip 128 includes a temperature sensor 132. The temperature sensor 132 is positioned so as to directly abut the surface 16 of the piping section 12 when the clip 128 is engaged with the piping section 12, and is configured to measure an operating temperature of the piping section 12. Any acceptable temperature sensor is usable. In some embodiments, the temperature sensor 132 is a contact temperature sensor, and the clip 128 is configured to exert a force when fixed on the piping section 12 that acts to maintain a solid contact between the temperature sensor 132 and the surface 16 of the piping section 12. In other embodiments, the temperature sensor 132 is included on the clip 126, or at any other acceptable location on the first sensor 102.

Figure 5:
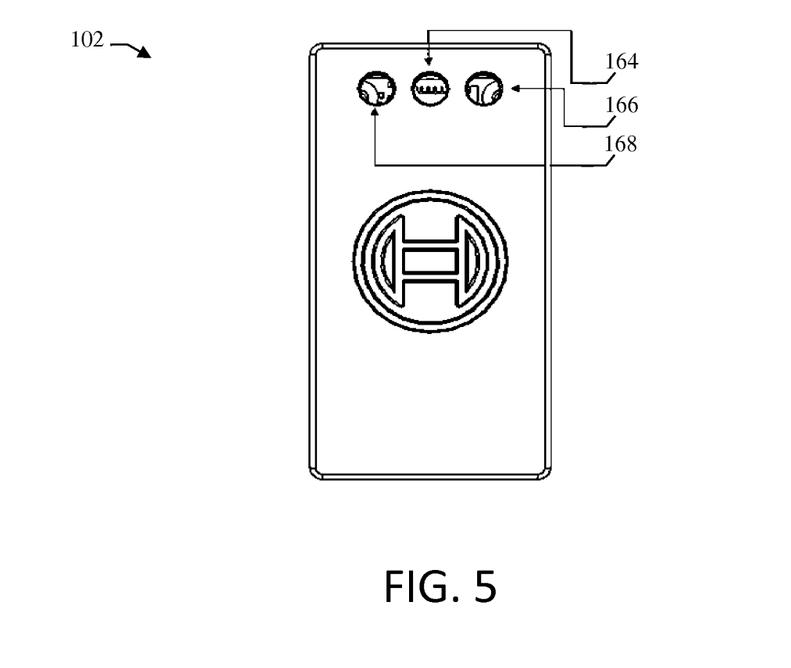
FIG. 5 depicts a top view of the sensing device of FIG. 2.
Figure 6:
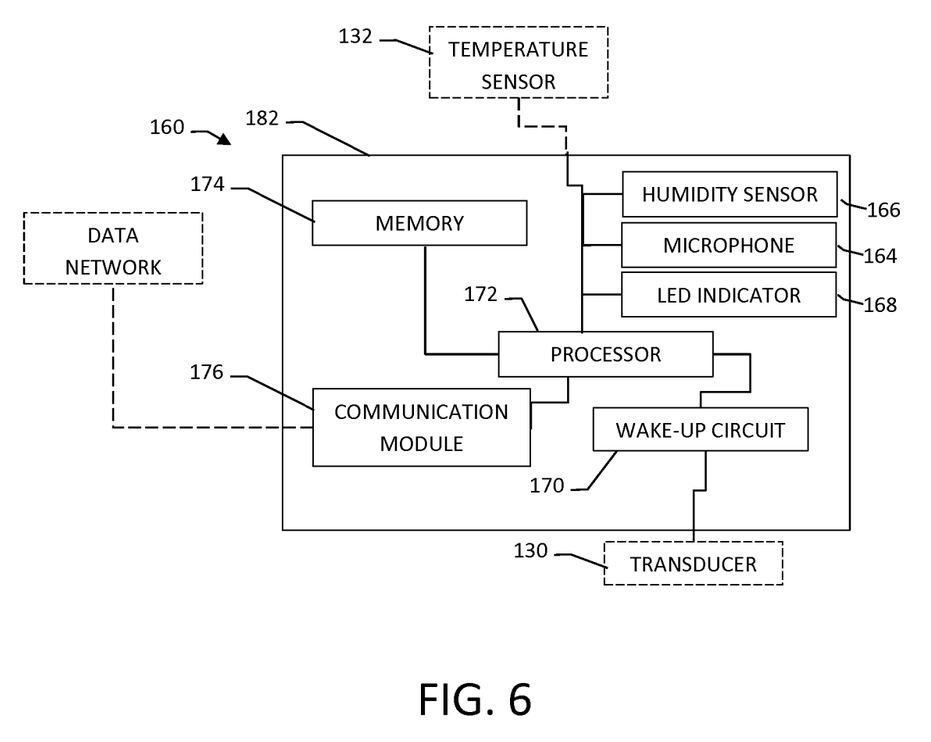
FIG. 6 depicts a schematic of the sensor device of FIG. 2.

The electronics portion 160 (FIG. 2) includes a body 162 that houses a plurality of electronic components, such as a power supply configured to store power and supply the power to the sensor 102 (not shown), for example a battery. FIG. 6 depicts a schematic for the electronics portion 160 of the first sensor 102. As depicted in FIGS. 5 and 6, the electronics portion 160 further includes a microphone 164, a humidity sensor 166, an LED status indicator 168 a wake-up circuit 170, a processor 172, a memory 174, a communication module 176, and an electronics circuit board 182.

The microphone 164, humidity sensor 166, and LED status indicator 168 are mounted on a top 170 of the body 162 (FIG. 5) so as to be exposed to the area 14 around the piping section 12. The microphone 164 is configured to capture audio signals from the area 14 surrounding the piping section 12. In some embodiments, the microphone 164 is configured to capture audio signals that originate from outside of the piping section 12. The humidity sensor 166 is configured to sense an ambient humidity in the area 14 surrounding the piping section 12. The indicator 168 is configured to emit a visual signal to a user, such as whether the sensor 102 is powered, is processing information, is communicating with the remote computing device 108, or is in a state of alarm.

With reference to FIG. 6, the processor 172, memory 174, and communication module 176 are mounted in common on the electronics circuit board 182, which is housed inside of the body 162. In different embodiments, different components are mounted on one or more electronic circuit boards or are mounted elsewhere in the body 162, or elsewhere in the sensor 102.

The temperature sensor 132, microphone 164, the humidity sensor 166, the indicator 168, the memory 174, and the communication module 176 are each operatively connected to the processor 172. Such components are also operatively connected to the power supply (not shown).

The processor 172 is configured to selectively operate the first sensor 102 between a stand-by, i.e., power saving mode, and an active, i.e. full power mode. In the stand-by mode, the processor 172 is configured to minimize power consumption, for example in order to maximize a lifetime of the battery. While most of the components of the first sensor 102 remain in a low power mode or are unpowered, in some embodiments, the processor 172 is configured to poll the non-acoustic sensors, i.e., the temperature sensor 132 and the humidity sensor 166, at regular predetermined intervals. In some embodiments, the processor 172 is configured to operate the first sensor 102 in the stand-by mode by default, and only transition the operation of the first sensor 102 to the active mode in response to the poll, a signal from another device, or an instruction from the wake-up circuit 170, as discussed in further detail below. In the active mode, the processor 172 is configured to determine an operating state of the piping section 12 with reference to the temperature sensor 132, humidity sensor 166, the transducer 130, and the microphone 164, and perform an operation based on the determination, as discussed below in further detail.

The wake-up circuit 170 is operatively connected between the transducer 130 and the processor 172, and is configured to transmit an instruction to the processor 172 configured to cause the processor 172 to transition to operating the first sensor 102 in the active mode in response to the voltage from the transducer 130 being above a predetermined threshold. In other words, since the voltage produced by the transducer 130 is based on the audio level (dB) of an audio signal emanating from the piping section 12, an audio signal sufficient to induce a voltage in the transducer above the predetermined threshold causes the wake-up circuit 170 to instruct the processor 172 to transition to the active mode.

The memory 174 stores historical information about the piping system 10, such as water usage, temperature, humidity, acoustic characteristics, etc. The memory 174 additionally stores predetermined operating ranges for the piping system such as, for example, a temperature operating range, humidity threshold, and a pressure operating range.

In some embodiments, the memory 174 further stores audio data including features of acoustic signatures corresponding to particular events. Examples of a particular event includes events indicative of a fault such as water dripping, spraying, or splashing noise, as well as events indicative of no fault such as ambient noise, machine noise, and noise originating from devices utilizing the pipe system 10 such as appliances like a washer, shower, toilet, dishwasher, etc., or other appliances like pumps, filters, boilers, etc. An acoustic signature is an audio signature associated with or generated due to a particular event. Features of an acoustic signature include any acceptable descriptive aspect of the audio signal. In some embodiments, features are mel-frequency cepstral coefficients ("MFCC"s) extracted from the audio signal.

In some embodiments, the memory 174 also stores one or more machine learning algorithms. For example, in some embodiments, the memory 174 includes a first machine learning algorithm operable to determine operating characteristics and flow patterns of the piping system 10 based on signals from the first sensor 102 and/or other devices in the system 100 such as the second sensor 104, actuator 106, and remote computing device 108. In some embodiments, the first machine learning algorithm operates with reference to historical usage information and/or audio data captured by the sensor 102 and/or other devices in the system 100. In some embodiments, the first machine learning algorithm is operable to assign the actuator 106 to a fault detected in the piping system 10. In other words, the first machine learning algorithm is operable to determine that a fault in the piping system 10 is located such that activating the actuator 106 mitigates or reduces an effect of the fault.

In some embodiments, the memory 174 includes a second machine learning algorithm operable to associate an audio signal received via the transducer 130 and/or the microphone 164 with a particular event. In some embodiments, the second machine learning algorithm is configured to operate with reference to user instructions, such as identification of the particular event by the user. In some embodiments, the second machine learning algorithm is configured to identify a received audio signal as a fault event or a non-fault event with reference to operating conditions of the piping section 12 and/or the pipe system 10 over a time period associated with the audio signal.

The memory 174 also stores pre-trained and/or learned classification parameters usable with the one or more machine learning algorithms. In various embodiments, the parameters and/or the one or more machine learning algorithms are pre-loaded into the memory 174, are accumulated and updated over time, and/or a combination thereof. In some embodiments, the one or more machine learning algorithms include at least one of a deep learning algorithm, a nearest neighbor algorithm, a support vector algorithm, a convolutional network, and any other acceptable machine learning technique. The memory 174 further stores a noise-cancelling algorithm operable to isolate audio signals emanating from the piping section 12 from ambient noise in the area 14 surrounding the piping section 12.

The communication module 176 is operable to enable communication between the first sensor 102 and one or more of the second sensor 104, the actuator 106, the remote computing device 108, and other devices. In some embodiments, the communication module 176 is configured to send and receive transmissions over a data network such as the internet. In some embodiments, the communication module 176 transfers data via WiFi, BTE, LoRa, a light weight messaging protocol such as MQTT, or any other acceptable communications protocol. In some embodiments, the communication module 176 provides access to the memory 174 to other devices and/or retrieves data from other devices and stores the retrieved data in the memory 174. In some embodiments, the communication module 176 and the communication device 134 are configured to cooperate so that the memory 174 and memory 132 operate as networked memory. As discussed in further detail below, in various embodiments, a communication includes one or more of information indicative of the operating state of the piping section 12 and pipe system 10, historical information about the piping system 10, indications of a fault in the piping section 12 and/or pipe system 10, instructions, and other data.

Figure 7:
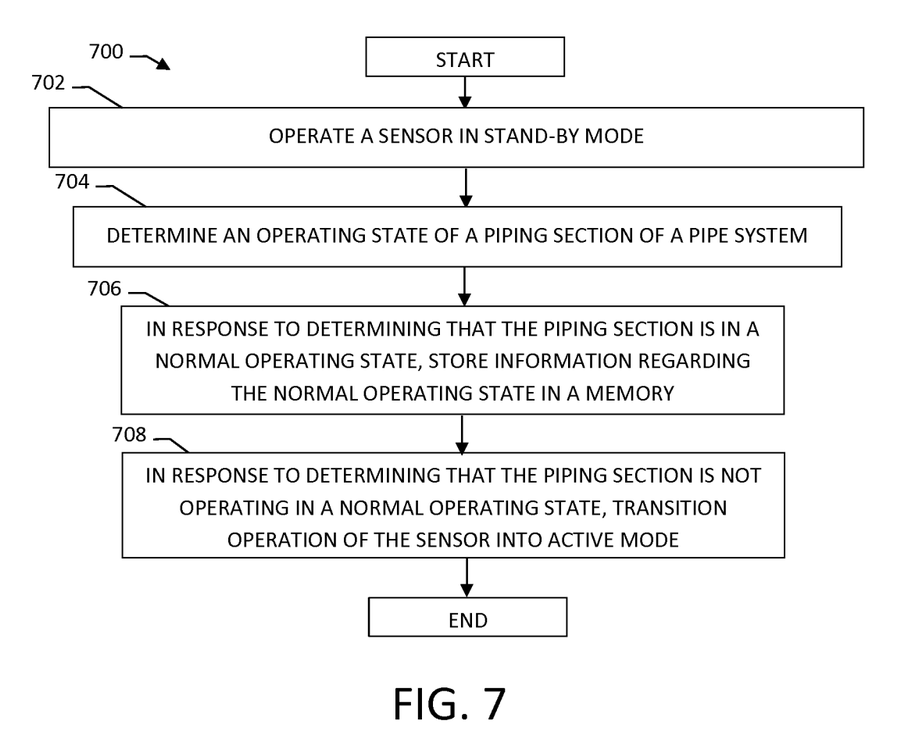
FIG. 7 depicts a flow diagram of an exemplary embodiment of a process of operating the sensing device of FIG. 2.

FIG. 7 depicts a flow diagram of an exemplary embodiment of a process for operation of the first sensor 102 in the stand-by mode. At block 702, the processor 172 is operating the first sensor 102 in the stand-by mode. At block 704, the processor determines an operating state of the piping section 12. In some embodiments, the processor 172 polls the temperature sensor 132 and the humidity sensor 166 at a regular interval, and makes the determination based on the poll. In some embodiments, determining that the piping section 12 is not operating normally includes receiving an indication from the temperature sensor 132 that the piping section 12 is operating outside of the operational temperature range, i.e., below a freezing limit or above a temperature/pressure limit. Operating outside of the operational temperature range could cause the piping section 12 to bursting from freezing or from overpressure due to heat. In some embodiments, determining that the piping section 12 is not operating normally includes receiving an indication from the humidity sensor 166 that the ambient humidity in the area 14 around the piping section 12 is above the predetermined humidity threshold. Excess humidity in the environment around the pipe 108 may be indicative of a leak in a non-actively-monitored section of pipe. In some embodiments, the determination is based on a machine learning algorithm such as the second machine learning algorithm discussed above.

At block 706, the processor 172, in response to determining that the piping section 12 is in a normal operating state, stores information regarding the normal operating state in the memory 174. In some embodiments, the processor 172 periodically operates the communication module 176 to transmit data with regard to historical usage and operation of the piping section 12 to the remote computing device 108 and/or other devices, and to receive information regarding the historical usage and operation of the pipe system 10. In some embodiments, such data includes audio data pertaining to potential sources of ambient noise in and around the pipe system 10. In some embodiments, the processor 172 uses the data regarding the historical usage and operation of the piping section 12 to update the one or more machine learning algorithms stored in the memory 174.

At block 708, in response to determining that the piping section 12 is not operating in a normal operating state, the processor 172 is configured to transition the first sensor 102 into the active mode.

Figure 8:
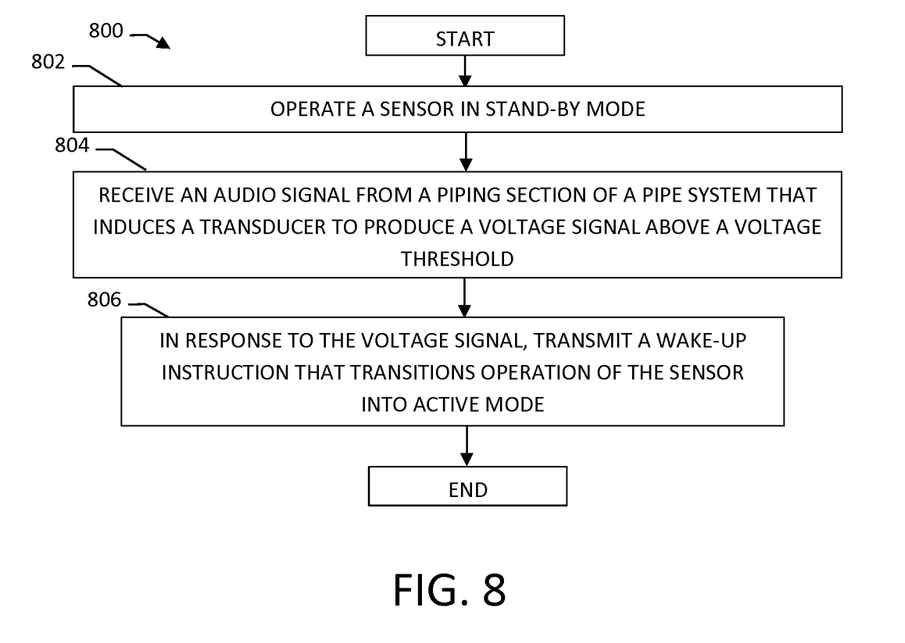
FIG. 8 depicts a flow diagram of another exemplary embodiment of a process of operating the sensing device of FIG. 2.

FIG. 8 depicts a flow diagram of another exemplary embodiment of a process for operation of the first sensor 102 in the stand-by mode. At block 802, the processor 172 is operating the first sensor 102 in the stand-by mode. At block 804, an audio signal in the piping section 12 induces the transducer 130 to produce a voltage signal above the predetermined threshold for the wake-up circuit 170. At block 806, the wake-up circuit 170, in response to the voltage signal being above the predetermined threshold, transmits a wake-up instruction to the processor 172, and at block 808, the processor 172 transitions operation of the first sensor 102 into the active mode.

Figure 9:
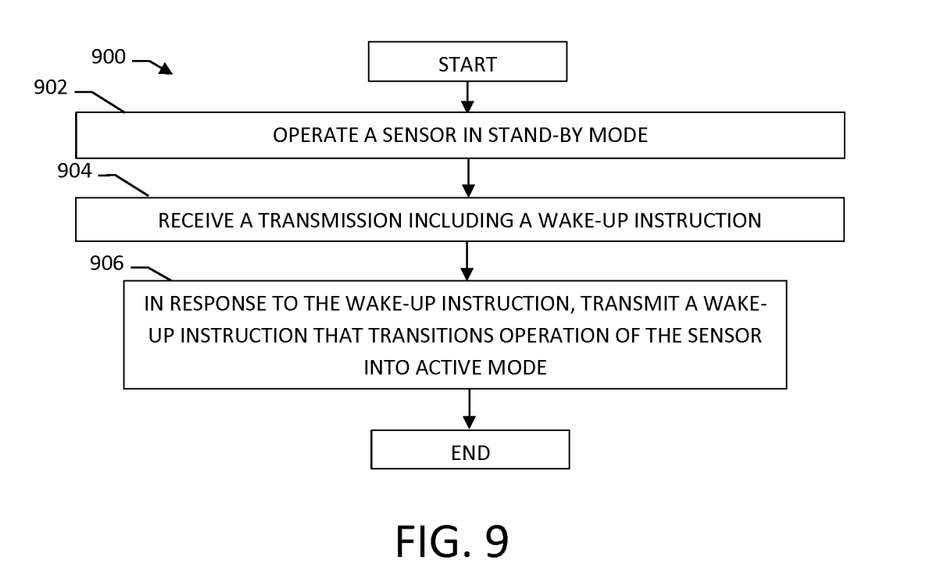
FIG. 9 depicts a flow diagram of another exemplary embodiment of a process of operating the sensing device of FIG. 2.

FIG. 9 depicts a flow diagram of another exemplary embodiment of a process for operation of the first sensor 102 in the stand-by mode. At block 902, the processor 172 is operating the first sensor 102 in the stand-by mode. At block 904, the processor 108 receives, via the communication module 176, a transmission including a wake-up instruction for the sensor 102. In some embodiments, the wake-up instruction is received from the remote computing device 108 due to a user interaction with the remote computing device. In some embodiments, the wake-up instruction is received from the remote computing device 108 in response to a determination that there is a fault in the piping system 10. In some embodiments, the wake-up instruction is received from the second sensor 104, such as in response to the detection of a fault in the piping system 10 by the second sensor 104. At block 906, in response to the wake-up instruction, the processor 108 transitions operation of the first sensor 102 to the active mode.

Figure 10:
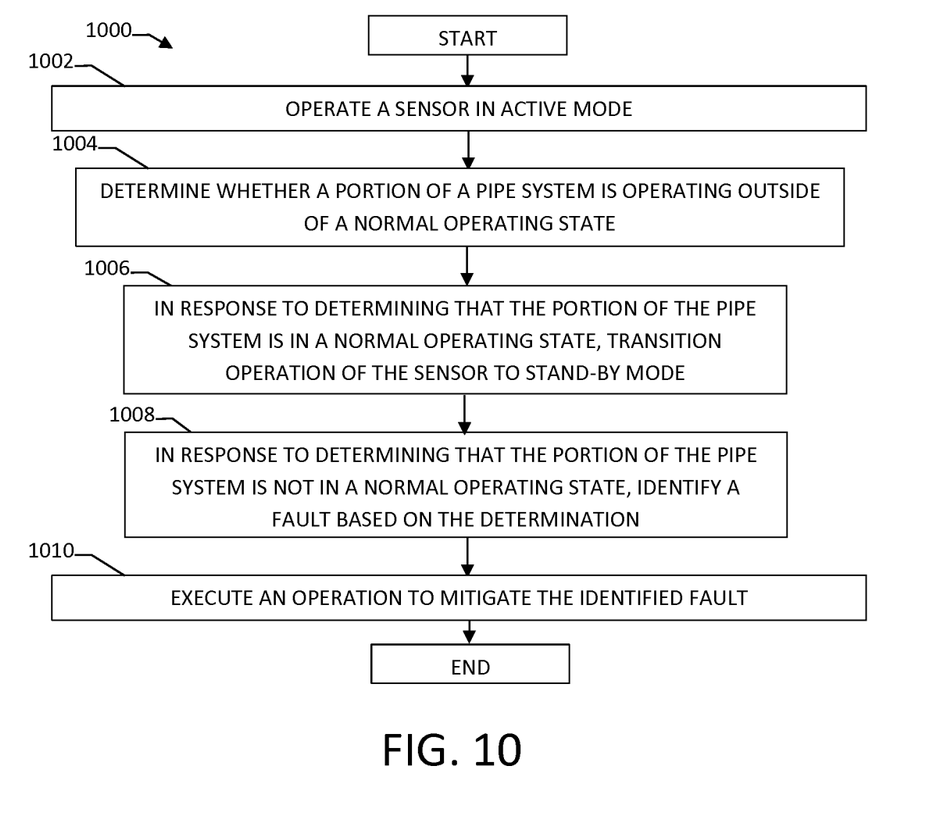
FIG. 10 depicts a flow diagram of another exemplary embodiment of a process of operating the sensing device of FIG. 2.

FIG. 10 depicts a flow diagram of an exemplary embodiment of a process for operation of the first sensor 102 in the active mode. At block 1002, the processor 172 is operating the first sensor 102 in the active mode. At block 1004, the processor 172 determines whether the piping section 12 and/or the pipe system 10 is operating outside of the normal operating state with reference to indications from one or more of the transducer 130, the temperature sensor 132, the microphone 164, and the humidity sensor 166.

At block 1006, in response to determining that the piping section 12 and pipe system 10 are operating in the normal operating state, the processor 172 is configured to transition the operation of the sensor to the stand-by mode. In some embodiments, the processor 172 additionally uses the communication module 176 to transmit a no-fault indication to the remote computing device 108 and/or another device in the system 100, such as a device from which the first sensor 102 received a wake-up instruction. In some embodiments, the processor 172 additionally stores information from the one or more of the transducer 130, the temperature sensor 132, the microphone 164, and the humidity sensor 166 in the memory 174, and/or transmits the information to another device in the system 100. In some embodiments, the processor 172 uses the information to update the one or more machine learning algorithms in the memory 174.

At block 1008, in response to determining that the piping section 12 and/or the pipe system 10 is not operating in the normal operating state, the processor 172 is configured to identify a fault based on the determination. In various embodiments, the identification is based on one or more of, (i) an indication received from another device in the system 100 such as the second sensor 104 or the remote computing device 108, (ii) an indication from the temperature sensor 132 that the piping section 12 is operating outside of the operational temperature range, (iii) an indication from the humidity sensor 166 that the ambient humidity in the area 14 around the piping section 12 is above the predetermined humidity threshold, and (iv) a determination that an acoustic signal in the audio data from one or more of the transducer 130 and the microphone 164 is indicative of a fault, as discussed in more detail below.

In various embodiments, the identified fault includes one or more of a temperature fault, a humidity fault, a flow fault, a pressure fault, a leak fault, or any other type of fault having an effect on the operation of the pipe system 10. In some embodiments, an identification of a fault includes an identification of a location of the fault within the pipe system 10. In some embodiments, the location of a fault is identified with reference to the information from the one or more of the transducer 130, the temperature sensor 132, the microphone 164, and the humidity sensor 166.

At block 1010, the processor 172 executes an operation to mitigate the identified fault. In some embodiments, the operation includes identifying an actuator 106 assigned to the piping section 12, and sending an activation instruction to the assigned actuator 106 via the communication module 176. In an example, the identified fault is a leak fault indicative of a leak in the pipe system 10 proximate to the piping section 12, and the actuator 106 is assigned to the piping section 12 due to being at a location whereat, once activated, the actuator 106 is configured to interrupt a flow through the piping section 12.

In some embodiments, the operation includes transmitting a wake-up instruction to the second sensor 104. In an example, in some cases, identifying a location of a fault within the pipe system 10 based on only the first sensor 102 may be inaccurate, and the first sensor 102 is configured to activate the second sensor 104 in order to cooperate with the second sensor 104 to identify a location of the fault.

In some embodiments, the operation includes transmitting a notification via the communication module 176 to the remote computing device 108. In an example, the first sensor 102 transmits a message to a mobile phone 108 of a user with a message including information regarding the identified fault.

In some embodiments, the operation includes an additional operation by another device in the system 100. In some embodiments, the remote computing device 108 is configured to receive an instruction from a user to activate the actuator 106. In an example, the first sensor 102 transmits a notification of a fault to the remote computing device 108. A user operating the remote computing device 108 views the notification, and issues an instruction to the remote computing device 108 to activate the actuator 106 and/or activate the second sensor 104.

In some embodiments, as discussed above, a fault is identified with reference to a determination that an acoustic signal in the audio data from one or more of the transducer 130 and the microphone 164 is indicative of a fault. Unlike the temperature sensor 132 and humidity sensor 166, which indicate a fault with reference to whether the piping section 12 is operating within the predetermined operating ranges, in some embodiments, the transducer 130 and microphone 164 do not indicate a fault merely based on whether a received audio signal is within a predetermined range. Instead, the processor 172 is configured to process audio signals received by the transducer 130 and/or the microphone 164 in order to make an inference about the operating state of the piping section 12 and/or the pipe system 10, and identify a fault based on the inference.

In some embodiments, the processor 172 separates audio data for an audio signal received by the transducer 130 and or microphone 164 into segments, and extracts features such as MFCCs from each segment. The processor 172 compares the extracted features with features corresponding to audio signatures of particular events stored in the memory 174, and determines that the audio signal is indicative of the particular event based on the comparison.

In some embodiments, the processor 172 is configured to apply the one or more machine learning algorithms to the audio signal in order to determine an operating condition of the piping section 12 and/or pipe system 10. In an example, the processor 172 uses the first machine learning algorithm to determine operating characteristics of the piping section 12 and/or the pipe system 10. The processor 172 determines whether the operating characteristics of the piping section 12 and/or the pipe system 10 deviate by more than a predetermined threshold from historical information about the operating characteristics for the piping section 12 and/or the pipe system 10, and identifies a fault based on the determination.

In some embodiments, the processor 172 is configured to apply the one or more machine learning algorithms to the audio signal in order to determine an occurrence of a particular event in the piping section 12 and/or pipe system 10. In an example, the processor 172 uses the second machine learning algorithm to determine that the audio signal is indicative of the occurrence of a particular event. The processor 172 extracts features from the audio signal, compares the extracted features with features for particular events stored in the memory 174, and determines that a particular event corresponds to the audio signal.

Figure 11:
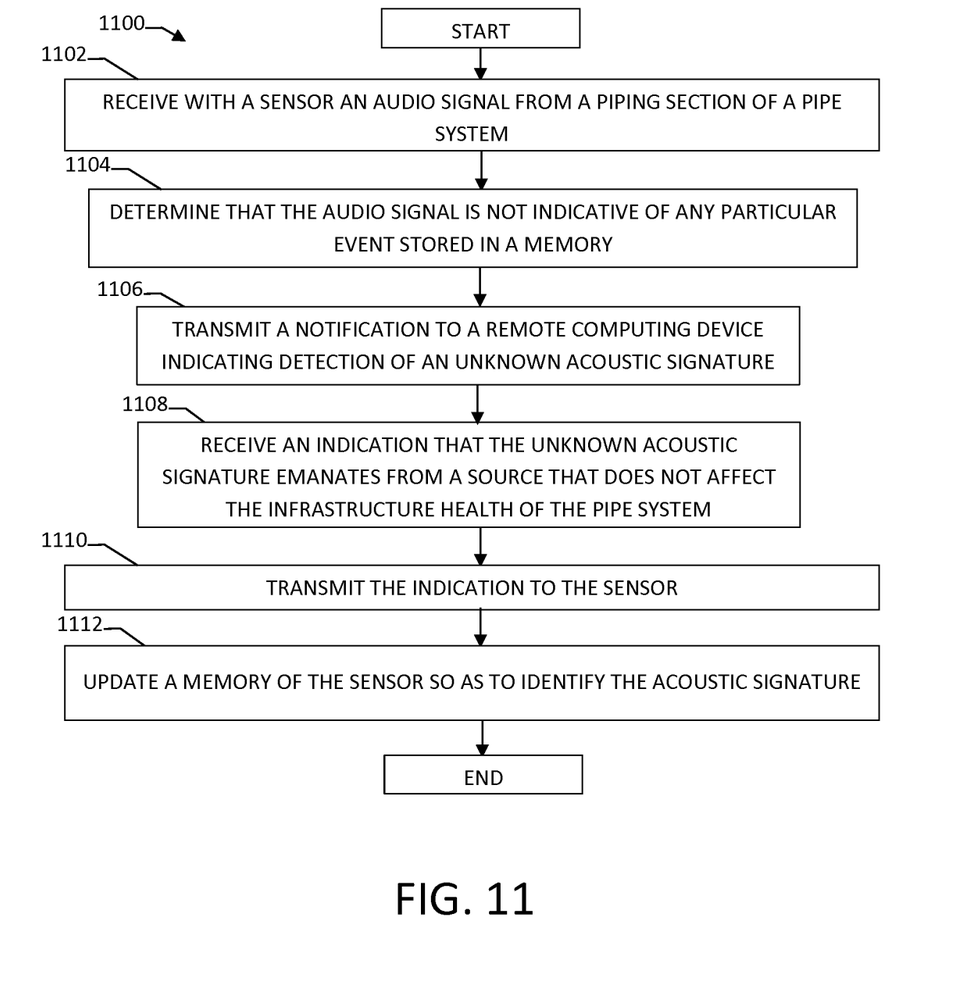
FIG. 11 depicts a flow diagram of an exemplary embodiment of a process of operating the monitoring system of FIG. 1.

In some embodiments, the processor 172 is configured to apply the second machine learning algorithm to the audio signal, and determine that the audio signal is not indicative of any particular event stored in the memory. FIG. 11 is a flow diagram depicting an exemplary embodiment of a process 1100 for using the system 100. At block 1102, the first sensor 102 receives an audio signal from the piping section 12. At block 1104, the processor 172 determines that the audio signal is not indicative of any particular event stored in the memory 174. In other words, the processor 172 determined that an acoustic signal captured by at least one of the transducer 130 and microphone 164 did not match any of the classified acoustic signatures stored in the memory 174.

At block 1106, the processor 172 transmits a notification to the remote computing device 108 indicating detection of an unidentified acoustic signature. In some embodiments, the notification 1102 includes audio data pertaining to the unidentified acoustic signature and/or operating characteristics of the piping section 12 and/or pipe system 10 in a time period proximate to the detection. At block 1108, the system 100 receives an indication that the unknown acoustic signature emanates from a source that does not affect the infrastructure health of the pipe system 10. In various embodiments, the indication is received from a user via the input device 136 of the remote computing device 108, via the first machine learning algorithm, or via any other acceptable process. Examples of sources of an acoustic signal that does not affect the infrastructure health of the piping system 10 include an appliance or machine, ambient noise from traffic or construction, or the like.

In some embodiments, the indication includes a name for the unidentified acoustic signature entered by the user, such as "Washing Machine," or the like that identifies the source of the acoustic signature. At block 1110, the remote computing device 108 transmits the indication to the first sensor 102. At block 1112, the processor 172 updates the memory 174 based on the indication so as to identify the unidentified acoustic signature. In some embodiments, the processor 172 updates the second machine learning algorithm based on the indication.

Figure 12:
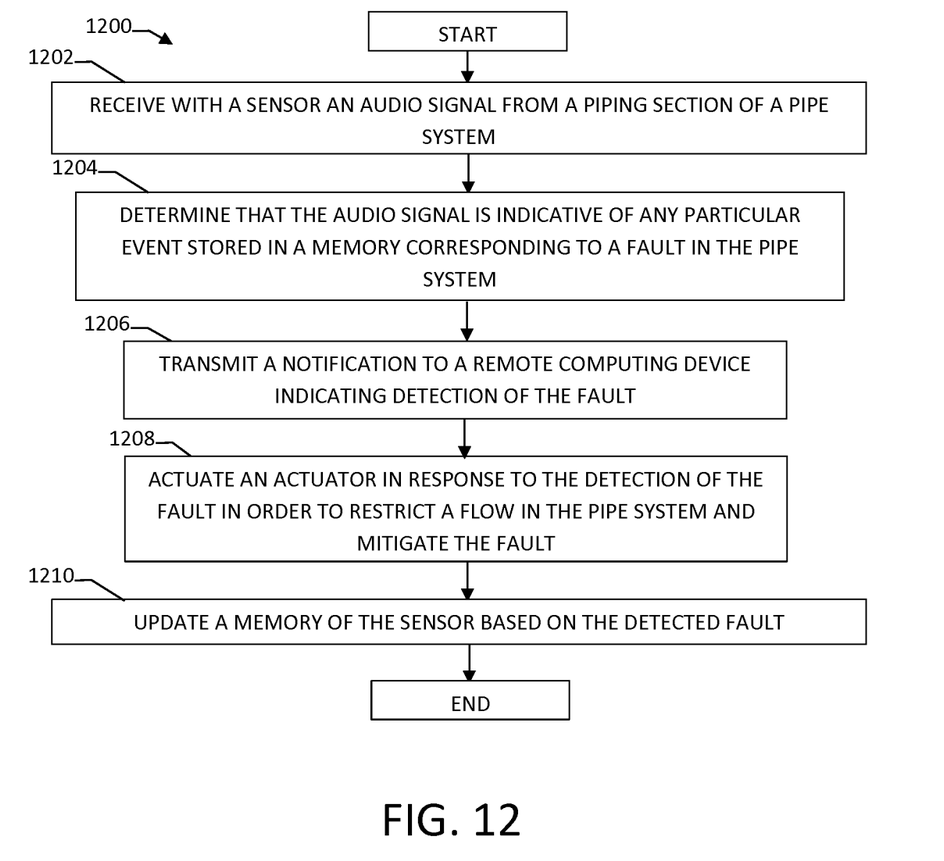
FIG. 12 depicts another flow diagram of an exemplary embodiment of a process of operating the monitoring system of FIG. 1.

FIG. 12 is a flow diagram depicting another exemplary embodiment of a process 1200 for using the system 100. At block 1202, the first sensor 102 receives an audio signal from the piping section 12. At block 1204, the processor 172 determines that the audio signal is indicative of a particular event stored in the memory 174 corresponding to a fault in the pipe system 10

At block 1206, the processor 172 transmits a notification to the remote computing device 108 indicating detection of the fault. In some embodiments, the notification 1102 includes audio data pertaining to the unidentified acoustic signature and/or operating characteristics of the piping section 12 and/or pipe system 10 in a time period proximate to the detection. In some embodiments, the notification includes a prompt for the user to inspect a portion of the pipe system 10 such as the piping section 12 or another location related to the detected fault.

At block 1208, the actuator 106 is activated in response to the detection in order to restrict the flow in the piping section 20 and mitigate the fault. In some embodiments, the activation is caused by an instruction transmitted from the remote computing device 108 in response to an inputted instruction from the user. In some embodiments, the remote computing device 108 determines that the actuator 106 is to be activated in response to the detected fault. In some embodiments, the processor 172 determines that the actuator 106 is to be activated in response to the detected fault.

At block 1210, the processor 172 updates the memory 174 based on the detected fault. In some embodiments, the processor 172 updates one or more of the first and second machine learning algorithms based on the detected fault.

In some embodiments, the processor 172 is configured to use the audio signals captured using the microphone 164 as a noise reference for the audio signal captured from the transducer 130. For example, in some embodiments, the processor 172 is configured to apply a noise-cancellation algorithm to an audio signal captured using the transducer 130 with reference to a further audio signal captured using the microphone 164 in order to isolate sounds emanating from the piping section 12 from sounds having an external source. The isolation of sounds emanating from the piping section 12 reduces the risk of a false-positive leak determination due to ambient noise. In some embodiments, the noise cancelling algorithm includes removing audio signals captured via the microphone 164 from audio signals concurrently captured via the transducer 130.

In some embodiments, the processor 172 applies the second machine learning algorithm to audio signals captured via the microphone 164 in order to classify features of ambient noises in the environment around the piping section 12. By subtracting different features or sets of features from the audio signal captured via the transducer 130, the processor 172 is able to isolate sounds emanating from the piping section 12 even when the signals concurrently captured via the microphone 164 are not adapted for noise cancellation.

In some of the embodiment discussed above, the processor 172 is located onboard the first sensor 102, Such embodiments are an example of edge computing, whereby computing is conducted in situ rather than at a centralized location. In some embodiments, the processor 172 of a first sensor 102 is configured to operate the communication module 176 to communicate with processors located on other devices, such as the second sensor 104, so that the sensors 102 are configured to operate in concert as a distributed mesh network. In some embodiments, the system 100 additionally includes a cloud-based platform or a hub that assembles data to and from a plurality of devices and performs additional data analysis.

This disclosure is not limited to the features discussed with regard to any one individual embodiment.

In some embodiments, an acoustic transducer is attached to a pipe via a built-in clamp.

In some embodiments, a circuit is configured to monitor the acoustic transducer and initiate a wake-up sequence based on the monitoring of the acoustic transducer.

In some embodiments, a microphone is configured to capture an ambient audio signal.

In some embodiments, the ambient audio signal is used to cancel-out non-pipe acoustic sounds.

In some embodiments, the ambient audio signal is used to capture surrounding environmental noise for infrastructure monitoring.

In some embodiments, a temperature sensor is attached to a pipe via a built-in clamp, and is configured to monitor a temperature of the pipe.

In some embodiments, a humidity sensor is used to detect moisture that originates from unmonitored sections of pipe, from outside the piping system, or other sources.

In some embodiments, a method of detecting leaks and/or a departure from historical water flow or usage in a piping system includes using at least one machine learning algorithm.

In some embodiments, the method includes storing learned and/or pre-trained features for the at least one machine learning algorithm.

In some embodiments, the method includes alerting a user in the event of a leak or fault.

In some embodiments, the method includes operating an actuator in response to detecting the leak or fault.

In some embodiments, the method includes storing historical information of the piping system on a cloud-based system.

In some embodiments, the method includes performing data analysis of the historical information and/or signals from signals from devices attached to the piping system, such as the acoustic transducer.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A sensing device for monitoring a pipe system, the sensing device comprising:
   a processor configured to selectively operate the sensing device in a stand-by mode and in an active mode;
   at least one sensor configured to sense at least one operating characteristic of a piping section of the pipe system, the at least one sensor including a transducer configured such that an audio signal emanating in the piping section induces the transducer to produce a voltage signal indicative of the audio signal powered only by the audio signal while the processor is operating the sensing device in the stand-by mode; and
   a wake-up circuit operatively connected with the transducer, and configured to generate a wake-up signal in response to the voltage signal produced by the transducer being above a predetermined threshold while the sensing device is being operated in the stand-by mode, wherein
   the processor is configured to transition the sensing device from the stand-by mode to the active mode in response to receiving the wake-up signal, and to identify an operating condition of the pipe system with reference to the at least one operating characteristic sensed by the at least one sensor in the active mode.

2. The sensing device of claim 1, further comprising:
   a fastening mechanism configured to mount the sensing device on the piping section,
   wherein the transducer is positioned on the fastening mechanism such that the transducer is in direct contact with a surface of the piping section when the sensing device is mounted on the piping section via the fastening mechanism.

3. The sensing device of claim 2, wherein:
   the at least one sensor further includes:
      a temperature sensor configured to sense a temperature of the piping section; and
      a humidity sensor configured to sense a humidity in an area around the piping section; and
   the temperature sensor is positioned on the fastening mechanism such that the temperature sensor is in direct contact with the surface of the piping section when the sensing device is mounted on the piping section via the fastening mechanism.

4. The sensing device of claim 1, further comprising:
   a memory that stores:
      a first machine learning algorithm operable by the processor to determine a normal operating condition of the pipe system with reference to the at least one sensor over time; and
      first data indicative of the normal operating condition of the pipe system;
   wherein the processor is further configured to identify a fault in the pipe system by determining that the identified operating condition diverges from the normal operating condition.

5. The sensing device of claim 1, further comprising:
   a memory that stores:
      first audio data indicative of the audio signal emanating in the piping section; and
      second audio data including an acoustic signature corresponding to a particular event occurring in at least one of the piping section and an area surrounding the piping section, the particular event corresponding to an operating condition of the pipe system;
   wherein the processor is configured to identify the operating condition of the pipe system by comparing the audio signal from the first audio data and the acoustic signature of the second audio data, and determining that the audio signal is indicative of the particular event.

6. The sensing device of claim 5, wherein:
   the at least one sensor further includes a microphone configured to capture a further audio signal emanating from an area surrounding the piping section; and
   the processor is further configured to apply a noise-cancelling algorithm to the audio signal emanating in the piping section with reference to the further audio signal.

7. The sensing device of claim 5 wherein the memory further stores a second machine learning algorithm operable by the processor to identify a correspondence between a respective operating condition of the pipe system and a respective particular event.

8. The sensing device of claim 1, further comprising:
   a communication module operatively connected to the processor, and operable to at least one of transmit and receive information with regard to the operating condition of the pipe system.

9. A system for monitoring a pipe system, comprising:
   a first sensing device including:
      at least one sensor configured to sense at least one operating characteristic of a piping section of the pipe system, the at least one sensor including a transducer configured such that an audio signal emanating in the piping section induces the transducer to produce a voltage signal indicative of the audio signal powered only by the audio signal while the sensing device is being operated in a stand-by mode;

a wake-up circuit operatively connected with the transducer, and configured to generate a wake-up signal in response to the voltage signal produced by the transducer being above a predetermined threshold while the sensing device is being operated in the stand-by mode; and a processor configured to:
selectively operate the first sensing device in the stand-by mode and in an active mode;
when operating the first sensor device in the stand-by mode, transition the operating of the first sensor device to the active mode in response to the wake-up signal; and
when operating the first sensor device in the active mode, identify an operating condition of the pipe system with reference to the at least one operating characteristic sensed by the at least one sensor.

10. The system of claim 9, wherein the first sensor device further includes a first communication module operatively connected to the processor, and operable to at least one of transmit and receive information with regard to the operating condition of the pipe system.

11. The system of claim 10, further comprising:
an actuator including:
a valve element operable to selectively restrict and enable flow through a portion of the pipe system; and
a second communication module, wherein:
the information transmitted by the first communication module includes an activation instruction;
the second communication module is configured to receive the activation instruction, and activate the valve element in response to the received activation instruction.

12. The system of claim 10, further comprising:
a remote computing device including:
a third communication module configured to at least one of transmit and receive information to and from the first sensing device;
an output device; and
a further processor configured to output, via the output device, information with regard to the operating condition of the pipe system received by the third communication module.

13. The system of claim 12, wherein:
the further processor is configured to transmit further information with regard to the operating condition of the pipe system to the first sensing device;
the first sensing device further includes a memory that stores first data corresponding to the operating condition of the pipe system; and
the processor is configured to update the first data based on the further information in response to receiving the further information from the remote computing device.

14. The system of claim 13, further comprising:
an actuator including:
a valve element operable to selectively restrict and enable flow through a portion of the pipe system; and
a second communication module, wherein:
the further information transmitted by the remote computing device includes an activation instruction;
the second communication module is configured to receive the activation instruction, and activate the valve element in response to the received activation instruction.

15. The system of claim 9, wherein:
the first sensing device further includes a memory that stores:
first audio data indicative of the audio signal emanating in the piping section; and
second audio data including an acoustic signature corresponding to a particular event occurring in at least one of the piping section and an area surrounding the piping section, the particular event corresponding to an operating condition of the pipe system; and
the processor is configured to identify the operating condition of the pipe system by comparing the audio signal from the first audio data and the acoustic signature of the second audio data, and determining that the audio signal is indicative of the particular event.

* * * * *